(12) United States Patent
Mehl

(10) Patent No.: US 6,696,530 B2
(45) Date of Patent: Feb. 24, 2004

(54) FLAME RESISTANT HALOGEN-FREE POLYMER MIXTURE

(75) Inventor: Alfred Mehl, Georgensgmuend (DE)

(73) Assignee: Nexans, Paris (FR)

( * ) Notice: Subject to any disclaimer, the term of this patent is extended or adjusted under 35 U.S.C. 154(b) by 211 days.

(21) Appl. No.: 10/006,565

(22) Filed: Dec. 10, 2001

(65) Prior Publication Data

US 2002/0072554 A1 Jun. 13, 2002

(30) Foreign Application Priority Data

Dec. 11, 2000 (EP) .............................. 00403495

(51) Int. Cl.[7] ..................... C08G 65/32; C08G 18/00; C08L 71/02; C08L 75/00; C08F 283/04
(52) U.S. Cl. .................... 525/453; 525/403; 525/452; 525/455; 525/460; 525/474
(58) Field of Search ................. 525/403, 452, 525/453, 455, 460, 474

(56) References Cited

U.S. PATENT DOCUMENTS 4,116,786 A * 9/1978 Hodakowski
4,728,690 A * 3/1988 Lammerting et al.

* cited by examiner

*Primary Examiner*—Patrick D. Niland
(74) *Attorney, Agent, or Firm*—Sughrue Mion, PLLC

(57) ABSTRACT

A flame resistant, halogen-free polymer mixture is described, particularly for the sheath of cables and conductors, comprising polyurethane, fillers and additives, wherein 1 to 10 parts of polysiloxane, which contains functional methacrylate and/or epoxy groups, are added to 100 parts of the flame resistant halogen-free polyurethane.

3 Claims, No Drawings

FLAME RESISTANT HALOGEN-FREE POLYMER MIXTURE

This application is based on and claims the benefit of European Patent Application No. 00403495.5 filed Dec. 11, 2000, which is incorporated by reference herein.

BACKGROUND OF THE INVENTION

The present invention relates to a flame resistant, halogen-free polymer mixture in accordance with the preamble of claim 1.

Thermoplastically processable polyurethane is a material that has proven successful as a sheath material in the cable industry due its excellent properties. The material is highly abrasion resistant, has high thermal stability, and can be made flame resistant to self-extinguishing by adding certain materials. Cable sheaths made of polyurethane exhibit resistance to cutting, initial tearing, and tear propagation. In addition, polyurethane is resistant to ozone, microbes, oil, and high-energy radiation. Cables equipped with a polyurethane sheath are extremely flexible and can withstand high numbers of bending cycles over tight radii.

Polyurethane sheathed cables are particularly suitable for use as control cables or drag chains, but are also used in transport technology.

DE-A-39 04 802 discloses a flame resistant, halogen-free polymer mixture for cable sheaths comprising 50–90 parts by weight of polyurethane, 10–50 parts by weight of polyolefin copolymer, 125–250 parts by weight of fillers, and 5–26 parts by weight of additives.

The known polymer mixture is oil and abrasion resistant, gives off relatively low fumes in case of fire, and does not release any corrosive gases. The fillers used, in particular, are aluminum hydroxide (aluminum trioxyhydrate) or magnesium hydroxide. A particularly advantageous additive is a hydrolysis protectant, which greatly reduces the tendency of polyurethane to hydrolyze at temperatures above 50° C. and under the action of humidity. A coupling agent is added to cause at least partial bonding of the filler to the polymers and to ensure better mechanical and electrical properties of the polymer mixture.

Thermoplastically processable polyurethane—which will be referred to as TPU below—has the mostly undesirable characteristic that it forms a relatively thin melt at elevated temperatures. In case of fire, this has the effect that the liquid material drips off and the cable core is thus exposed. At extremely high temperatures, the materials added to improve flame-resistance are frequently inadequate, and burning or hot material drips and, under some circumstances, ignites other material, thereby causing a rapid expansion of fire.

DE-A-34 44 500 discloses a hardly inflammable cable in which at least the outer layer of the cable sheath consists of fully or partially irradiation cross-linked polyurethane. The cross-linked polyurethane forms a flame resistant, closed envelope, which does not drip under the action of flames and thus does not subsequently permit the underlying layers in the cable construction to melt in the flames.

The drawback, however, is that irradiation cross-linking is a separate process step, and irradiation cross-linking systems are subject to particularly high requirements, which drives up the production costs. A further drawback is that cross-linked polyurethane is not recyclable and is expensive to dispose of.

SUMMARY OF THE INVENTION

Thus, the object of the present invention is to provide a flame resistant halogen-free polymer mixture, which can be thermoplastically processed, does not drip in case of fire, and can be recycled after processing.

This object is attained by the features set forth in the characterizing part of claim 1.

Other advantageous embodiments of the invention are set forth in the dependent claims.

In case of fire, the TPU according to the invention forms a crusty layer, which prevents molten, burning material from dripping. This crust has heat-insulating properties, which prevent accelerated heating of the material under the action of the flames.

DETAILED DESCRIPTION OF THE INVENTION

The invention will now be described in greater detail with the aid of two exemplary embodiments.

a) 100.00 parts TPU, Shore hardness A87, e.g., Elastollan 1185A by Elastogran, 66.7 parts aluminum hydroxide, e.g., Martinal OL 104S by Martinswerk, 18.6 parts resorcinol-bis-diphenyl phosphate, e.g., CR-733S by Nordmann & Rassmann, and 0.6 parts erucic acid amide, e.g., Loxamid E by Henkel were intimately mixed on a Buss-Co-kneader, molten, and processed into a granulate. The granulates were placed into an extruder, and with this mixture a sheath having a wall thickness of 1 mm was extruded onto the cable core.

b) To a mixture as indicated above, 5.3 parts of a polysiloxane with functional methylate groups, e.g., 4-7081 silicon powder by Dow Corning, were added and processed into a granulate in a Buss-Co-kneader as described under a) above and used to extrude a cable sheath, also as described under a) above.

The cables produced according to a) and b) were subjected to a fire test in accordance with IEC 60332-1. Both cables passed the test. In the cable produced according to a), the sheath material partially dripped off and the cable core was exposed and damaged. In the cable produced according to b), a black, porous, stable layer had formed on the cable during exposure to the flames. The cable core was not impaired.

Due to the formation of this porous, stable crust, the flame resistance is also generally improved. A material test sample produced according to a) had an oxygen index of 26—measured in accordance with EN ISO 4589-1—while a material test sample produced according to b) had an oxygen index of 28.

Similarly, the dripping behavior during a fire of other halogen-free flame resistant TPU compounds can be improved, e.g., those containing melamine derivatives (e.g., melamine cyanurate) and/or phosphoric acid esters (e.g., resorcinol-bis-diphenyl phosphate) as flameproofing additives.

What is claimed is:

1. Flame resistant, halogen-free polymer mixture, particularly for the sheath of cables and conductors, comprising polyurethane, fillers and additives, characterized in that 1 to 10 parts of polysiloxane, which contains functional methacrylate and/or epoxy groups, are added to 100 parts of the flame resistant, halogen-free polyurethane.

2. Flame resistant, halogen-free polymer mixture as claimed in claim 1, characterized in that 3 to 7 parts of polysiloxane, which contains functional methacrylate and/or epoxy groups, are added to 100 parts of the flame resistant halogen-free polyurethane.

3. Flame resistant, halogen-free polymer mixtures as claimed in claim 1, characterized in that the polyurethane is a polyether polyurethane.

* * * * *